US011315100B2

(12) United States Patent
Yeddula et al.

(10) Patent No.: US 11,315,100 B2
(45) Date of Patent: Apr. 26, 2022

(54) SYSTEM, METHOD, AND COMPUTER PROGRAM PRODUCT FOR PARTITIONING MOBILE DEVICE TRANSACTIONS

(71) Applicant: Visa International Service Association, San Francisco, CA (US)

(72) Inventors: Prasanth Yeddula, Sunnyvale, CA (US); Ashwini Laxminarayana Tantry, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/268,541

(22) PCT Filed: Aug. 14, 2018

(86) PCT No.: PCT/US2018/046640
§ 371 (c)(1),
(2) Date: Feb. 15, 2021

(87) PCT Pub. No.: WO2020/036588
PCT Pub. Date: Feb. 20, 2020

(65) Prior Publication Data
US 2021/0312420 A1 Oct. 7, 2021

(51) Int. Cl.
*G06Q 20/10* (2012.01)
*G06Q 20/22* (2012.01)
*G06Q 20/32* (2012.01)

(52) U.S. Cl.
CPC ......... *G06Q 20/322* (2013.01); *G06Q 20/102* (2013.01); *G06Q 20/227* (2013.01); *G06Q 20/3276* (2013.01)

(58) Field of Classification Search
None
See application file for complete search history.

(56) References Cited

U.S. PATENT DOCUMENTS 7,346,577 B1 * 3/2008 Williams ............... G06Q 20/02
705/34
9,792,605 B2 10/2017 Raja
(Continued)

FOREIGN PATENT DOCUMENTS

WO WO 2013/010070 A2 * 1/2013

OTHER PUBLICATIONS

Bentley, "Smart ways to pay", Technology, The Caterer, Sep. 26, 2014, pp. 34-36, retrieved from www.thecaterer.com.
(Continued)

*Primary Examiner* — Joseph W. King
(74) *Attorney, Agent, or Firm* — The Webb Law Firm

(57) ABSTRACT

A computer-implemented method for partitioning mobile device transactions may include generating a machine-readable indicia encoded with transaction data for a transaction between a merchant and at least one user; receiving a transaction request message comprising the transaction value and a split payment identifier; initiating a programmatic timer for a time interval in response to receiving the transaction request message from the first mobile device; receiving at least one additional transaction request message prior to expiration of the time interval; partitioning the transaction value between each of the first user account and the at least one other user account based at least partially on the transaction request message; and generating a separate authorization request message for each of the first user account and the at least one other user account, each authorization request message comprising a partial transaction value representing a portion of the transaction value.

19 Claims, 4 Drawing Sheets

(56) References Cited

U.S. PATENT DOCUMENTS

| | | |
|---|---|---|
| 2012/0209749 A1 | 8/2012 | Hammad et al. |
| 2013/0041824 A1 | 2/2013 | Gupta |
| 2013/0124412 A1 | 5/2013 | Itwaru |
| 2014/0279098 A1 | 9/2014 | Ham |
| 2015/0294291 A1 | 10/2015 | Lacoss-Arnold et al. |
| 2017/0372282 A1 | 12/2017 | Sarin |
| 2018/0108000 A1* | 4/2018 | Bhattacharjee ........ G06Q 30/02 |

OTHER PUBLICATIONS

Nagasubramanian et al., "Online Payment—Innovation in Split Tender Payment", International Journal of Computer Applications, Oct. 2012, pp. 35-41, vol. 55, No. 10.

Saettler, "Zapper boosts at-the-table mobile payments via QR codes", 2017, 5 pages, retrieved from https://www.retaildive.com/ex/mobilecommercedaily/zapper-boosts-at-the-table-mobile-payments-via-qr-codes.

* cited by examiner

SYSTEM, METHOD, AND COMPUTER PROGRAM PRODUCT FOR PARTITIONING MOBILE DEVICE TRANSACTIONS

CROSS-REFERENCE TO RELATED APPLICATION

This application is the United States national phase of International Application No. PCT/US2018/046640 filed Aug. 14, 2018, the disclosure of which is hereby incorporated by reference in its entirety.

BACKGROUND

Technical Field

The present disclosure relates to payment and transactional systems and, in non-limiting embodiments or aspects, a system, method, and computer program product for partitioning mobile device transactions.

Technical Description

In today's economy, consumers commonly carry multiple portable financial devices (e.g., credit cards and/or debit cards) in order to initiate transactions with merchants accepting such forms of payment. Most account holders have multiple portable financial devices in their possession, whether stored in their wallets, provisioned onto their mobile devices (e.g., tokens and/or electronic wallets), or hosted by payment providers. For example, on average in the United States, most users have more than three portable financial devices in their possession.

Consumers use the portable financial devices to conduct financial transactions with merchants. In one common scenario, multiple consumers may meet for drinks or a meal at a restaurant or bar. Often the merchant will generate a single bill for the entire group of consumers. Merchants currently offer the option to split the payment of the bill between the group of consumers. One method of splitting the payment of the bill includes the merchant taking a number of portable financial devices from the consumers (one portable financial device from each consumer), splitting the total bill amount by the number of portable financial devices, and separately processing each of the portable financial devices for the split amount due for each consumer. Each of these separate transactions costs the merchant a transaction fee. In the case of electronic wallets, the merchant needs to conduct several contactless or tap-based transactions with the consumers based on the split payment agreed to among the group of consumers. Likewise, each of these electronic wallet transactions is manually operated on the merchant terminal and treated as a separate transaction, each costing a separate transaction fee.

Options are currently available through applications in the marketplace that are used for splitting the bill, but not splitting the payment between consumers. These applications have a provision to split the transaction bill to only obtain an amount each consumer is responsible for paying. The payment transaction itself, however, is still conducted individually swiping each portable financial device by the merchant.

Therefore, there is a need in the art for an improved way of more quickly partitioning mobile device payments between a group of consumers that are paying a single transaction bill. There is a current need for a system that enables the merchant to treat the transaction bill as a whole and split the payment in real time by a payment gateway to settle the amount owed with an issuer instantaneously. By providing such a system, the merchant system can reduce the number of transaction requests that need to be forwarded to the transaction processing system by forwarding a single transaction request with a plurality of split payment identifiers to the transaction processing system. By only sending a single transaction request to the transaction processing system, data traffic between the merchant system and the transaction processing system is reduced, resulting in improved performance of the transaction processing system in processing the split payment transaction requests.

SUMMARY

According to non-limiting embodiments or aspects, a computer-implemented method for partitioning mobile device transactions may include generating, with at least one processor, a machine-readable indicia encoded with transaction data for a transaction between a merchant and at least one user, the transaction data comprising a transaction value; receiving, from a first mobile device associated with a first user account, a transaction request message comprising the transaction value and a split payment identifier, the transaction request message generated in response to the first mobile device scanning the machine-readable indicia; initiating, with at least one processor, a programmatic timer for a time interval in response to receiving the transaction request message from the first mobile device; receiving, from at least one other mobile device associated with at least one other user account, at least one additional transaction request message prior to expiration of the time interval, the at least one additional transaction request message generated in response to the at least one other mobile device scanning the machine-readable indicia; partitioning, with at least one processor, the transaction value between each of the first user account and the at least one other user account based at least partially on the transaction request message; and generating, with at least one processor, a separate authorization request message for each of the first user account and the at least one other user account, each authorization request message comprising a partial transaction value representing a portion of the transaction value.

In some non-limiting embodiments or aspects, the method further includes receiving, from a merchant system, the time interval. The machine-readable indicia may be generated by a merchant system. Partitioning the transaction value may include dividing the transaction value by a total number of user accounts associated with transaction request messages received within the time interval. The machine-readable indicia may include a two-dimensional bar code. The machine-readable indicia may include the split payment identifier. The machine-readable indicia may include a transaction identifier. The method may also include placing a hold on the first user account for the transaction value in response to receiving the transaction request message from the first mobile device.

According to non-limiting embodiments or aspects, a system for partitioning mobile device transactions may include at least one processor programmed or configured to: generate a machine-readable indicia encoded with transaction data for a transaction between a merchant and at least one user, the transaction data comprising a transaction value; receive, from a first mobile device associated with a first user account, a transaction request message comprising the transaction value and a split payment identifier, the transaction request message generated in response to the first mobile device scanning the machine-readable indicia; initiate a programmatic timer for a time interval in response to receiving the transaction request message from the first mobile device; receive, from at least one other mobile device associated with at least one other user account, at least one additional transaction request message prior to expiration of the time interval, the at least one additional transaction request message generated in response to the at least one other mobile device scanning the machine-readable indicia; partition the transaction value between each of the first user account and the at least one other user account based at least partially on the transaction request message; and generate a separate authorization request message for each of the first user account and the at least one other user account, each authorization request message comprising a partial transaction value representing a portion of the transaction value.

In some non-limiting embodiments or aspects, the at least one processor may be further programmed or configured to receive, from a merchant system, the time interval. The at least one processor may be further programmed or configured to place a hold on the first user account for the transaction value in response to receiving the transaction request message from the first mobile device. Partitioning the transaction value may include dividing the transaction value by a total number of user accounts associated with transaction request messages received within the time interval. The machine-readable indicia may include a two-dimensional bar code. The machine-readable indicia may include the split payment identifier. The machine-readable indicia may include a transaction identifier.

According to non-limiting embodiments or aspects, a computer program product for partitioning mobile device transactions may include at least one non-transitory computer readable medium including program instructions that, when executed by at least one processor, causes the processor to: generate a machine-readable indicia encoded with transaction data for a transaction between a merchant and at least one user, the transaction data comprising a transaction value; receive, from a first mobile device associated with a first user account, a transaction request message comprising the transaction value and a split payment identifier, the transaction request message generated in response to the first mobile device scanning the machine-readable indicia; initiate a programmatic timer for a time interval in response to receiving the transaction request message from the first mobile device; receive, from at least one other mobile device associated with at least one other user account, at least one additional transaction request message prior to expiration of the time interval, the at least one additional transaction request message generated in response to the at least one other mobile device scanning the machine-readable indicia; partition the transaction value between each of the first user account and the at least one other user account based at least partially on the transaction request message; and generate a separate authorization request message for each of the first user account and the at least one other user account, each authorization request message comprising a partial transaction value representing a portion of the transaction value.

In some non-limiting embodiments or aspects, the at least one processor may be further programmed or configured to receive, from a merchant system, the time interval. The at least one processor may be further programmed or configured to place a hold on the first user account for the transaction value in response to receiving the transaction request message from the first mobile device. Partitioning the transaction value may include dividing the transaction value by a total number of user accounts associated with transaction request messages received within the time interval. The machine-readable indicia may include a two-dimensional bar code. The machine-readable indicia may include the split payment identifier and a transaction identifier.

Further non-limiting embodiments or aspects are set forth in the following numbered clauses:

Clause 1: A computer-implemented method for partitioning mobile device transactions, comprising: generating, with at least one processor, a machine-readable indicia encoded with transaction data for a transaction between a merchant and at least one user, the transaction data comprising a transaction value; receiving, from a first mobile device associated with a first user account, a transaction request message comprising the transaction value and a split payment identifier, the transaction request message generated in response to the first mobile device scanning the machine-readable indicia; initiating, with at least one processor, a programmatic timer for a time interval in response to receiving the transaction request message from the first mobile device; receiving, from at least one other mobile device associated with at least one other user account, at least one additional transaction request message prior to expiration of the time interval, the at least one additional transaction request message generated in response to the at least one other mobile device scanning the machine-readable indicia; partitioning, with at least one processor, the transaction value between each of the first user account and the at least one other user account based at least partially on the transaction request message; and generating, with at least one processor, a separate authorization request message for each of the first user account and the at least one other user account, each authorization request message comprising a partial transaction value representing a portion of the transaction value.

Clause 2: The computer-implemented method of clause 1, further comprising receiving, from a merchant system, the time interval.

Clause 3: The computer-implemented method of clause 1 or clause 2, wherein the machine-readable indicia is generated by a merchant system.

Clause 4: The computer-implemented method of any of clauses 1-3, wherein partitioning the transaction value comprises dividing the transaction value by a total number of user accounts associated with transaction request messages received within the time interval.

Clause 5: The computer-implemented method of any of clauses 1-4, wherein the machine-readable indicia comprises a two-dimensional bar code.

Clause 6: The computer-implemented method of any of clauses 1-5, wherein the machine-readable indicia comprises the split payment identifier.

Clause 7: The computer-implemented method of any of clauses 1-6, wherein the machine-readable indicia comprises a transaction identifier.

Clause 8: The computer-implemented method of any of clauses 1-7, further comprising placing a hold on the first user account for the transaction value in response to receiving the transaction request message from the first mobile device.

Clause 9: A system for partitioning mobile device transactions, comprising at least one processor programmed or configured to: generate a machine-readable indicia encoded with transaction data for a transaction between a merchant and at least one user, the transaction data comprising a transaction value; receive, from a first mobile device associated with a first user account, a transaction request message comprising the transaction value and a split payment identifier, the transaction request message generated in response to the first mobile device scanning the machine-readable indicia; initiate a programmatic timer for a time interval in response to receiving the transaction request message from the first mobile device; receive, from at least one other mobile device associated with at least one other user account, at least one additional transaction request message prior to expiration of the time interval, the at least one additional transaction request message generated in response to the at least one other mobile device scanning the machine-readable indicia; partition the transaction value between each of the first user account and the at least one other user account based at least partially on the transaction request message; and generate a separate authorization request message for each of the first user account and the at least one other user account, each authorization request message comprising a partial transaction value representing a portion of the transaction value.

Clause 10: The system of clause 9, wherein the at least one processor is further programmed or configured to receive, from a merchant system, the time interval.

Clause 11: The system of clause 9 or clause 10, wherein the at least one processor is further programmed or configured to place a hold on the first user account for the transaction value in response to receiving the transaction request message from the first mobile device.

Clause 12: The system of any of clauses 9-11, wherein partitioning the transaction value comprises dividing the transaction value by a total number of user accounts associated with transaction request messages received within the time interval.

Clause 13: The system of any of clauses 9-12, wherein the machine-readable indicia comprises a two-dimensional bar code.

Clause 14: The system of any of clauses 9-13, wherein the machine-readable indicia comprises the split payment identifier.

Clause 15: The system of any of clauses 9-14, wherein the machine-readable indicia comprises a transaction identifier.

Clause 16: A computer program product for partitioning mobile device transactions, comprising at least one non-transitory computer readable medium including program instructions that, when executed by at least one processor, causes the processor to: generate a machine-readable indicia encoded with transaction data for a transaction between a merchant and at least one user, the transaction data comprising a transaction value; receive, from a first mobile device associated with a first user account, a transaction request message comprising the transaction value and a split payment identifier, the transaction request message generated in response to the first mobile device scanning the machine-readable indicia; initiate a programmatic timer for a time interval in response to receiving the transaction request message from the first mobile device; receive, from at least one other mobile device associated with at least one other user account, at least one additional transaction request message prior to expiration of the time interval, the at least one additional transaction request message generated in response to the at least one other mobile device scanning the machine-readable indicia; partition the transaction value between each of the first user account and the at least one other user account based at least partially on the transaction request message; and generate a separate authorization request message for each of the first user account and the at least one other user account, each authorization request message comprising a partial transaction value representing a portion of the transaction value.

Clause 17: The computer program product of clause 16, wherein the at least one processor is further programmed or configured to receive, from a merchant system, the time interval.

Clause 18: The computer program product of clause 16 or clause 17, wherein the at least one processor is further programmed or configured to place a hold on the first user account for the transaction value in response to receiving the transaction request message from the first mobile device.

Clause 19: The computer program product of any of clauses 16-18, wherein partitioning the transaction value comprises dividing the transaction value by a total number of user accounts associated with transaction request messages received within the time interval.

Clause 20: The computer program product of any of clauses 16-19, wherein the machine-readable indicia comprises a two-dimensional bar code.

Clause 21: The computer program product of any of clauses 16-20, wherein the machine-readable indicia comprises the split payment identifier and a transaction identifier.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
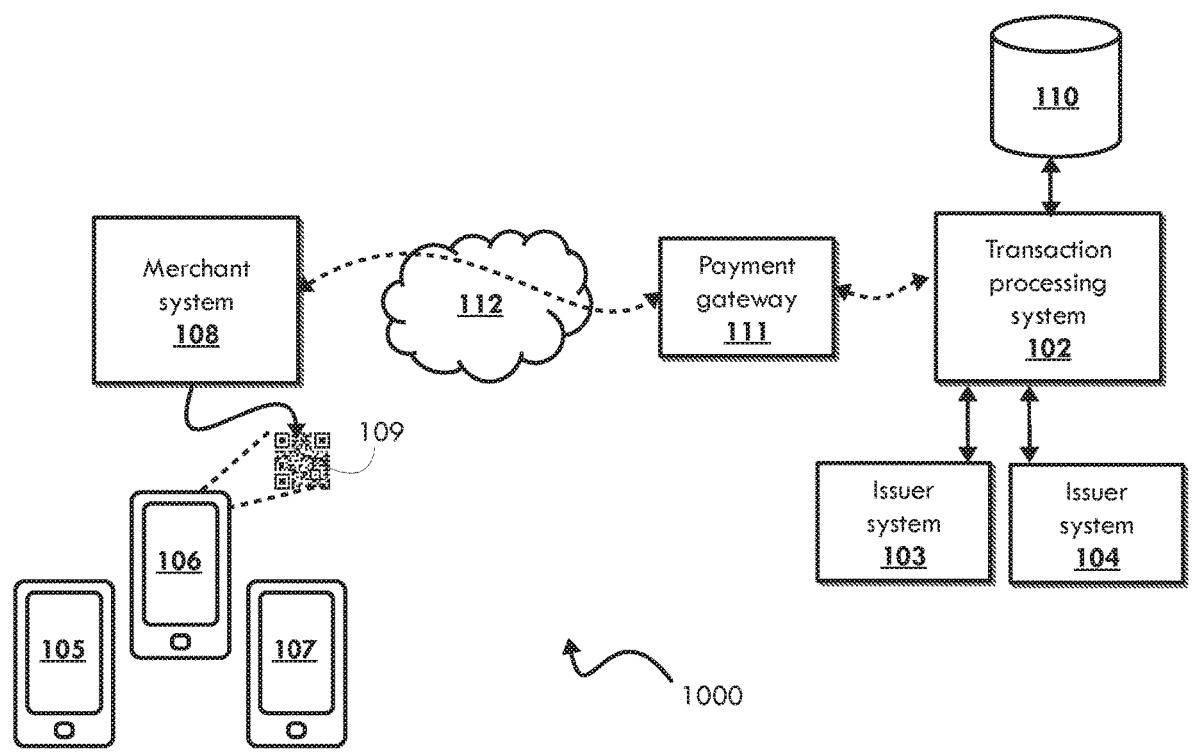
FIG. 1 is a schematic diagram of a system for partitioning mobile device transactions according to non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "acquirer institution" may refer to an entity licensed by the transaction service provider and approved by the transaction service provider to originate transactions using a portable financial device of the transaction service provider. The transactions may include original credit transactions (OCTs) and account funding transactions (AFTs). The acquirer institution may be authorized by the transaction service provider to originate transactions using a portable financial device of the transaction service provider. The acquirer institution may contract with a payment gateway to enable the facilitators to sponsor merchants. An acquirer institution may be a financial institution, such as a bank. The terms "acquirer institution," "acquirer bank," and "acquirer system" may also refer to one or more computer systems operated by or on behalf of an acquirer institution, such as a server computer executing one or more software applications.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices that are configured to directly or indirectly communicate with or over one or more networks. The computing device may be a mobile device. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side frontend and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant (PDA), a security card, an access card, a wireless terminal, and/or a transponder, as examples. The portable financial device may include a volatile or a non-volatile memory to store information, such as an account identifier or a name of the account holder.

The term "account data," as used herein, refers to any data concerning one or more accounts for one or more users. Account data may include, for example, one or more account identifiers, user identifiers, transaction histories, balances, credit limits, issuer institution identifiers, and/or the like.

A transaction request message may be generated based on one or more transaction parameters from the transaction data, such as the transaction value, a transaction code, a merchant identifier (e.g., a unique merchant identifier, a merchant name, a merchant location, and/or the like), and/or other information concerning the transaction.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

Non-limiting embodiments or aspects of the present disclosure are directed to a system, method, and computer program product for partitioning mobile device transactions that provides several technical advantages. Non-limiting embodiments or aspects allow for merchants to easily process split transactions for mobile device users without needing to separately process each split transaction, thereby using fewer computing resources of the merchant system and requiring fewer separate communications. Accordingly, non-limiting embodiments or aspects shift the processing of split payment transactions away from merchants and merchant systems to transaction processing systems, issuer systems, payment gateways, acquirer systems, and/or user mobile devices, allowing the merchant systems to operate more efficiently. Moreover, non-limiting embodiments or aspects utilize modified and unconventional authorization request messages including a split payment identifier, which allows for such split payments to be processed by a transaction processing system and/or issuer system without requiring separate instructions or messages, therefore requiring less bandwidth and network resources. It will be appreciated that various other technical advantages are provided by non-limiting embodiments or aspects.

Systems and methods for conducting split payment transactions are described in United States Patent Application Publication No. 2012/0209749 to Hammad et al., filed on Feb. 16, 2012, the disclosure of which is incorporated in its entirety by reference. Non-limiting embodiments or aspects described herein may utilize the systems, devices, messages, and processes described by United States Patent Application Publication No. 2012/0209749.

Referring now to FIG. 1, shown is a system 1000 for partitioning mobile device transactions according to non-limiting embodiments or aspects. The system 1000 includes a transaction processing system 102, issuer systems 103, 104, a plurality of mobile devices 105, 106, 107, a merchant system 108, and an account database 110. The merchant system may be in communication with the transaction processing system 102 via a network environment 112, such as a public or private network. It will be appreciated that the merchant system 108 may communicate with the transaction processing system 102 through a payment gateway 111 or acquirer system (not shown in FIG. 1). There may be any number of issuer systems 103, 104 and mobile devices 105, 106, 107 in any given situation. Each mobile device 105, 106, 107 may be provisioned with one or more tokens for making electronic payments through, for example, an electronic wallet application executing on each mobile device 105, 106, 107. Each token may correspond to a PAN and an issuer system 103, 104 for an issuer institution that issued the account and token.

With continued reference to FIG. 1, a group of users respectively operating mobile devices 105, 106, 107 may request a split transaction with a merchant corresponding to the merchant system 108. The merchant system 108, in response, generates a machine-readable indicia 109. The machine-readable indicia 109 may include, for example, a one-dimensional bar code, a two-dimensional barcode (e.g., a QR code), a string of alphanumeric characters, an icon or pattern, a digitally stored value, and/or the like. In non-limiting examples, the machine-readable indicia 109 may be a barcode for a push payment transaction. The machine-readable indicia 109 may be generated and displayed on a display device of the merchant system, on a mobile device operated by the merchant, on a printed receipt, on a separate printout, and/or the like. In non-limiting embodiments or aspects, the machine-readable indicia 109 includes a split payment identifier and transaction data (e.g., transaction value, unique transaction identifier, merchant identifier, etc.). For example, the machine-readable indicia 109 may have such data encoded or embedded therein at the time the machine-readable indicia 109 is generated. The split payment identifier may include, for example, a flag, value, or other indication that a split payment is requested. In some non-limiting examples, the split payment identifier may be a binary value (e.g., 0 or 1) to indicate whether the transaction is a split payment or not.

Still referring to FIG. 1, the machine-readable indicia 109 may be scanned by one or more of the mobile devices 105, 106, 107 of the users requesting the transaction. For example, a camera unit of the mobile devices 105, 106, 107 may be used to scan the machine-readable indicia 109 such that a respective processor of the mobile device 105, 106, 107 is able to extract information embedded or encoded in the machine-readable indicia 109. In some non-limiting embodiments or aspects, one or more other sensors of the mobile devices 105, 106, 107 may receive data from the machine-readable indicia 109. In non-limiting embodiments or aspects, an electronic wallet application, mobile device operating system, or other software application executing on the mobile devices 105, 106, 107 is used to extract data from the machine-readable indicia 109. In non-limiting embodiments or aspects, an electronic wallet application decodes and/or parses the machine-readable indicia 109 to determine if it includes a split payment identifier.

With continued reference to FIG. 1, in non-limiting embodiments or aspects, one or more graphical user interfaces (GUIs) may be displayed on the mobile devices 105, 106, 107 in response to scanning the machine-readable indicia 109. For example, each mobile device 105, 106, 107 that scans the machine-readable indicia 109 may be presented with a GUI through an electronic wallet application that includes selectable options to select a split payment option, such as a split payment option that partitions the transaction value evenly among all users, a split payment option that partitions the transaction value among all users according to a specified percentage, a split payment option that partitions the transaction value among all users according to specified values (e.g., a first consumer pays $12.00 for his/her meal and a second consumer pays $10.00 for his/her meal when the total transaction value is $22.00), and/or the like. In some non-limiting examples, the first mobile device 105, 106, 107 to scan the machine-readable indicia 109 may be presented with a GUI with selectable options to choose a split payment option to apply to that transaction and any mobile devices that subsequently scan the machine-readable indicia 109. In some non-limiting examples, each mobile device 105, 106, 107 may display a GUI that allows the respective mobile device user to input or select a specific amount to partition to that user.

In non-limiting embodiments or aspects, and with continued reference to FIG. 1, the mobile devices 105, 106, 107 may scan the machine-readable indicia in sequence. The transaction value may then be partitioned among the number of mobile devices 105, 106, 107 that scanned the machine-readable indicia. In non-limiting embodiments or aspects, in response to a first mobile device scanning the machine-readable indicia, the first mobile device generates a transaction request message (e.g., such as a push payment transaction request message) and communicates the transaction request message to the merchant system 108, payment gateway 111 or acquirer system, and/or transaction processing system 102. In non-limiting embodiments or aspects, the mobile devices 105, 106, 107 may communicate transaction request messages directly to a payment gateway 111, acquirer system, or transaction processing system 102. In non-limiting embodiments or aspects, the mobile devices 105, 106, 107 may communicate with the merchant system 108 which, in turn, communicates with a payment gateway 111, acquirer system, or transaction processing system 102.

In non-limiting embodiments or aspects, a programmatic timer may be initiated by the merchant system 108, payment gateway 111 or acquirer system, and/or transaction processing system 102 in response to receiving the first transaction request message from the first mobile device that scanned the machine-readable indicia 109. For example, in response to receiving a transaction request message including a split payment identifier, a payment gateway 111 and/or acquirer system may initiate the timer and wait for additional transaction request messages including the split payment identifier and/or a unique transaction identifier matching the transaction request message to the previous transaction request message. In such embodiments, the transaction value may be partitioned among the mobile devices 105, 106, 107 that scan the machine-readable indicia 109 during a time period (e.g., prior to expiration of the programmatic timer). Such a time period may be a default value or be specified by the merchant, transaction processing system, issuer, first mobile device that scans the indicia 109, and/or any other entity. In response to the time period elapsing, the payment gateway 111, acquirer system, or transaction processing system 102 may stop receiving additional transaction request messages for that transaction and may partition the transaction value by, for example, dividing the transaction value by the number of transaction request messages received or by a specified percentage. Separate authorization request messages may be generated by the payment gateway 111, acquirer system, and/or transaction processing system 102 and communicated to one or more issuer systems 103, 104 corresponding to the respective users' accounts.

In non-limiting embodiments or aspects, and still referring to FIG. 1, a first mobile device 106 that scans the machine-readable indicia 109 causes a transaction request message to be communicated from the payment gateway 111 and/or acquirer system to the transaction processing system 102 and/or issuer system 103. For example, in response to a first mobile device 106 scanning the machine-readable indicia 109, the first mobile device 106 may generate a transaction request message and communicate the transaction request message to the transaction processing system 102. In non-limiting embodiments or aspects, the transaction request message may be communicated to a payment gateway 111 and/or acquirer system in communication with the transaction processing system 102. The transaction request message may include transaction data and a split payment identifier. The split payment identifier in the transaction request message may be the same or a different split payment identifier that is embedded or encoded in the machine-readable indicia 109. The transaction request message may also include the full transaction value.

In non-limiting embodiments or aspects, and with continued reference to FIG. 1, the payment gateway 111, acquirer system, and/or transaction processing system 102 may authorize each user's account for the total transaction value. For example, a pre-authorization request message may authorize the total transaction value for each account corresponding to each mobile device 105, 106, 107, which is later modified to a partitioned transaction value with a subsequent authorization request message. In this manner, the merchant operating the merchant system 108 can be assured that a payment will be made by at least one of the mobile device users.

In non-limiting embodiments or aspects, the transaction request message may cause the full transaction value to be authorized for only the account of the first user that scanned the machine-readable indicia 109. For example, a pre-authorization request message may authorize the total transaction value for the account corresponding to the first mobile user which is later modified to a partitioned transaction value with a subsequent authorization request message. By authorizing the entire amount of the transaction value to the first user, the merchant is ensured that at least one user is responsible for the entire amount of the transaction value, regardless of whether additional users contribute to the payment of the total amount. In non-limiting embodiments or aspects, and as described above, a programmatic timer may be used such that, if additional users do not scan the machine-readable indicia 109 within the time period, the first user's account is charged the full transaction value.

In non-limiting embodiments or aspects, the merchant system 108 may display an indication on a display device to the merchant in response to receiving an authorization response message to either an authorization request message or pre-authorization request message communicated from the payment gateway 111 or transaction processing system 102 to an issuer system 103. The merchant system 108 may display a response for each mobile device that communicated a transaction request message, indicating if the corresponding authorization request message was approved or declined.

Figure 4A:
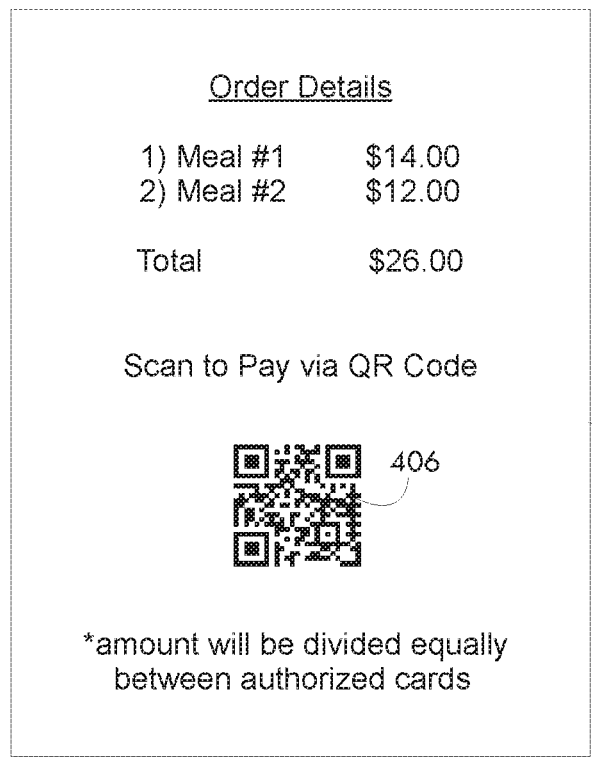
FIGS. 4A and 4B are graphical user interfaces or a merchant system according to non-limiting embodiments or aspects.
Figure 4B:
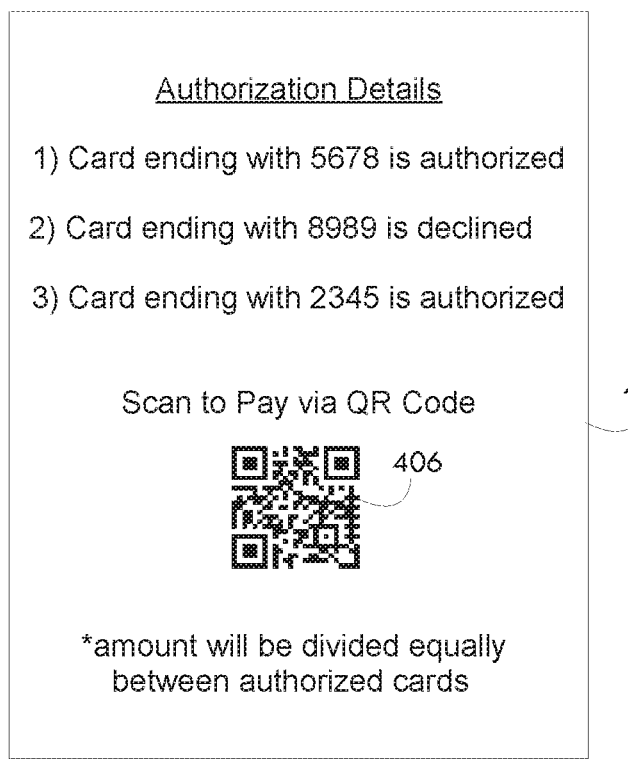

Referring now to FIGS. 4A and 4B, non-limiting embodiments or aspects of merchant GUIs 402, 404 are shown. The GUIs 402, 404 may be displayed by a merchant system although, in other non-limiting embodiments or aspects, the content of the GUIs 402, 404 may also be displayed on a printed receipt or paper. The GUI 402 shown in FIG. 4A shows the total transaction value and the machine-readable indicia 406 for the mobile devices to scan. The GUI 404 shown in FIG. 4B shows the result of each authorization request message after a mobile device scans the machine-readable indicia 109 and the machine-readable indicia 406. It will be appreciated that various arrangements and configurations of the GUIs 402, 404 are possible.

In non-limiting embodiments or aspects, some steps may be performed by one or more of the mobile devices 105, 106, 107 and/or the merchant system 108. For example, the merchant system may include one or more software applications configured to receive multiple transaction request messages, initiate a programmatic timer, and generate multiple separate transaction request messages. As another example, an electronic wallet application on at least one of the mobile devices 105, 106, 107 may be used to display the machine-readable indicia 109 through communication with the merchant system 108. It will be appreciated that other variations are possible.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
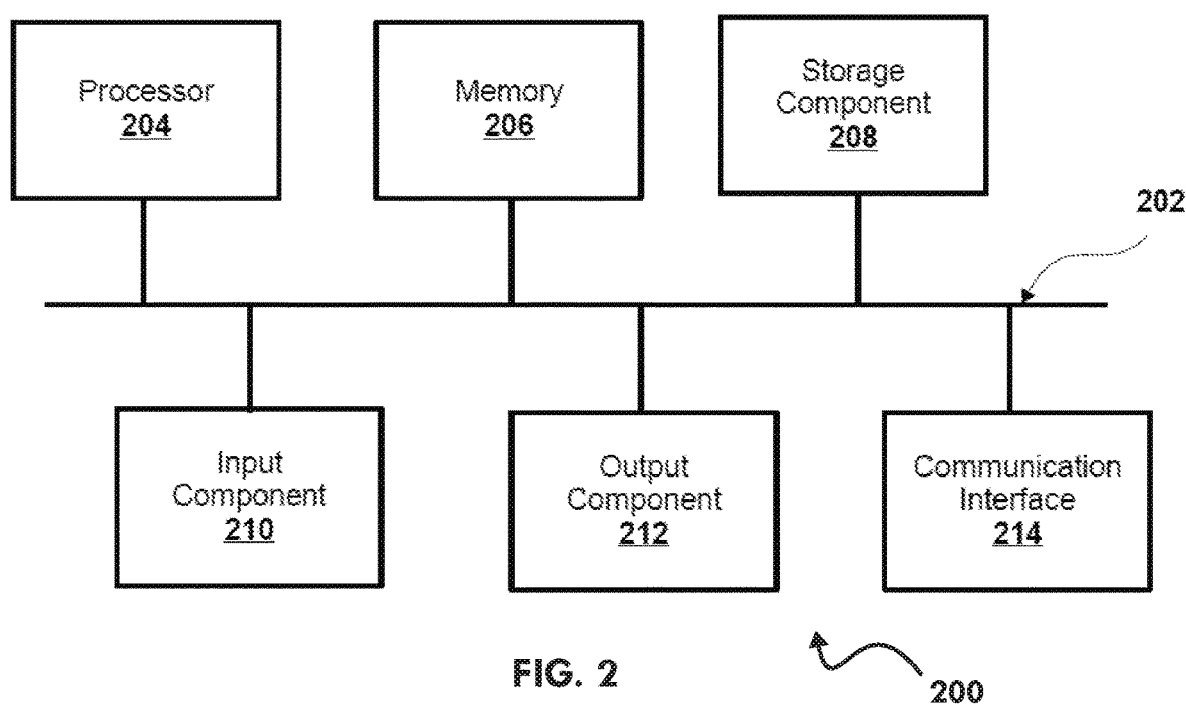
FIG. 2 is a schematic diagram of non-limiting embodiments or aspects of components of one or more devices shown in FIG. 1.

Referring now to FIG. 2, shown is a diagram of example components of a device 200 according to non-limiting embodiments or aspects. Device 200 may correspond to one or more devices of transaction processing system 102, one or more devices of issuer systems 103, 104, mobile devices 105, 106, 106, and/or merchant system 108. In some non-limiting embodiments or aspects, transaction processing system 102, issuer system 103, 104, mobile devices 105, 106, 107, and/or merchant system 108 may include at least one device 200 and/or at least one component of device 200. The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

As shown in FIG. 2, device 200 may include a bus 202, a processor 204, memory 206, a storage component 208, an input component 210, an output component 212, and a communication interface 214. Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

With continued reference to FIG. 2, storage component 208 may store information and/or software related to the operation and use of device 200. For example, storage component 208 may include a hard disk (e.g., a magnetic disk, an optical disk, a magneto-optic disk, a solid state disk, etc.) and/or another type of computer-readable medium. Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.). Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium may include any non-transitory memory device. A memory device includes memory space located inside of a single physical storage device or memory space spread across multiple physical storage devices. Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Figure 3:
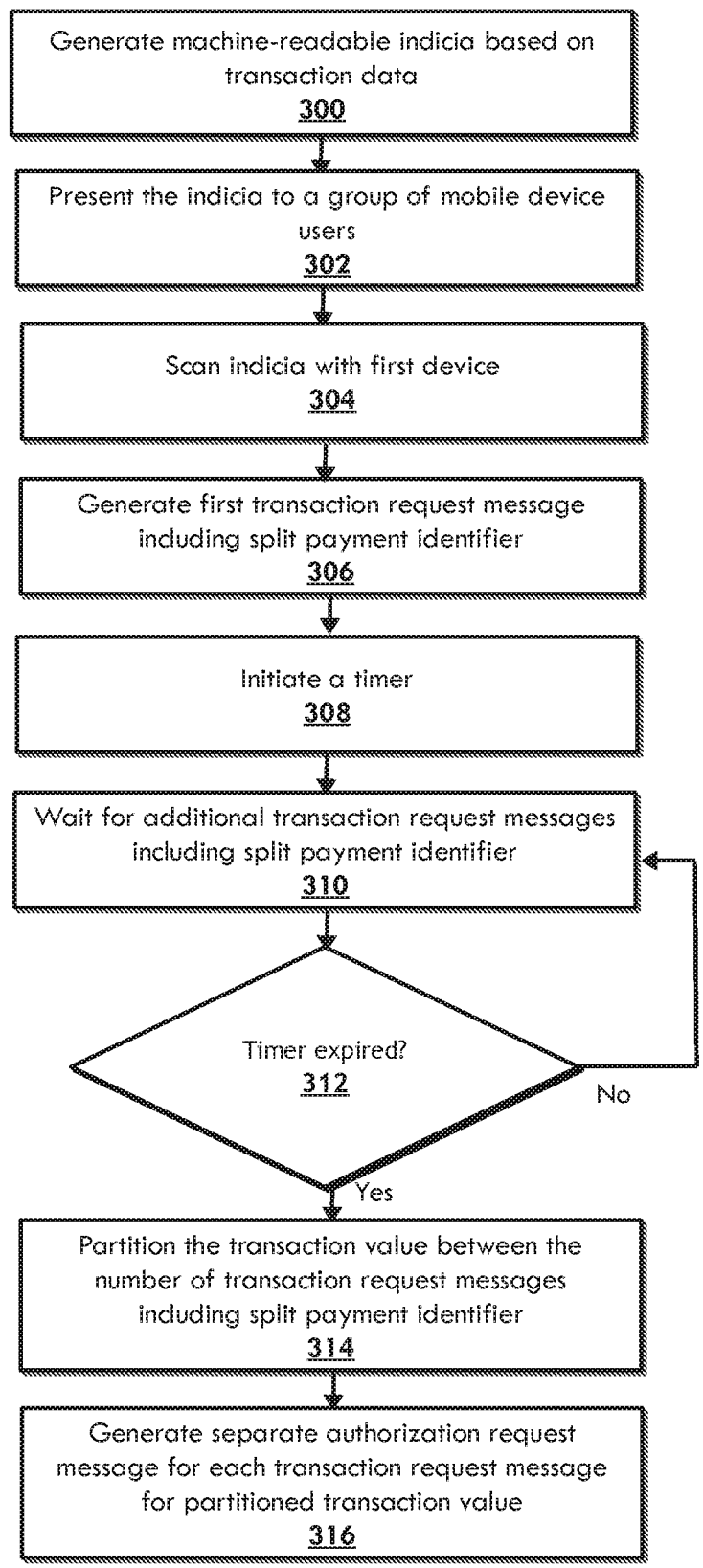
FIG. 3 is a flow diagram of a method for partitioning mobile device transactions according to non-limiting embodiments or aspects.

With reference to FIG. 3, a flow diagram is shown for non-limiting embodiments or aspects of a method for partitioning mobile device transactions. In a first step 300, the process includes generating a machine-readable indicia based on transaction data for a transaction between a merchant and one or more users. The machine-readable indicia may be generated by a merchant system issuer system, payment gateway, acquirer system, and/or transaction processing system. The machine-readable indicia may include a split payment identifier and a transaction value encoded or embedded therein. In a next step 302, the process includes presenting the machine-readable indicia to a group of mobile device users. For example, a merchant may print a receipt including the machine-readable indicia using a merchant system, a merchant may present the machine-readable indicia on a display of a merchant system, the machine-readable indicia may be presented on at least one display of one of the multiple mobile device users, or the machine-readable indicia may be presented in any other manner.

With continued reference to FIG. 3, in a next step 304, the process includes scanning the machine-readable indicia with a first mobile device. For example, a first mobile device user may use an application on his or her mobile device to receive data from the machine-readable indicia using a camera unit or antenna of the mobile device. In a next step 306, the process includes generating a first transaction request message including a split payment identifier. The transaction request message may be generated by the first mobile device in response to the first mobile device scanning the machine-readable indicia or by the merchant system in response to receiving a transaction request message or data to generate the transaction request message from the first mobile device. The transaction request message may include other transaction data as well, such as the transaction value, a merchant identifier, a transaction time, and/or the like. The transaction request message may be communicated by the first mobile device to a payment gateway and/or acquirer system or, in other non-limiting embodiments or aspects, may be communicated by the merchant system after the merchant system receives a transaction request message or data to generate the transaction request message from the mobile device.

With continued reference to FIG. 3, in a next step 308, the process includes initiating a programmatic timer for a time interval in response to receiving the transaction request message from the first mobile device. For example, a payment gateway and/or acquirer system in communication with the first mobile device may initiate the programmatic timer. In a next step 310, the process includes waiting for additional transaction request messages including split payment identifiers from additional mobile devices. For example, the payment gateway may monitor incoming transaction request messages to identify transaction request messages that match the first transaction request message generated at step 306. The payment gateway and/or another system may analyze each subsequent transaction request message to determine if it includes a matching split payment identifier or transaction identifier that correlates the transaction request message to the split transaction initially requested with the first transaction request message. Throughout step 310, the process checks at step 312 whether the timer has expired (e.g., whether the time period has elapsed). If the time period has not elapsed, the method continues waiting for additional transaction request messages at step 310. When the timer has expired and the time period elapsed at step 312, the process moves to step 314. In step 314, the transaction value is partitioned between the number of transaction request messages received from the mobile devices that include the split payment identifier or otherwise correspond. For example, the payment gateway or another system may divide the transaction value by the number of mobile device users participating in the transaction or by a specified percentage or allotment for each mobile device user.

Still referring to FIG. 3, in step 316, separate authorization request messages are generated for each partitioned transaction value. For example, a payment gateway and/or transaction processing system may generate a separate authorization request message for each transaction request message received that correspond to a single split payment transaction. Each separate authorization request may include an apportioned transaction value, less than the full transaction value, and identify a particular account of one mobile device user.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method for partitioning mobile device transactions, comprising:
generating, with a merchant system comprising at least one processor, a machine-readable indicia based at least partially on transaction data for a transaction between a merchant and at least one user, the transaction data comprising a transaction value;
receiving, with at least one processor of a payment gateway, acquirer system, or transaction processing system remote from the merchant system, from a first mobile device associated with a first user account, a first transaction request message comprising the transaction value and a split payment identifier, the first transaction request message generated by the first mobile device in response to the first mobile device scanning the machine-readable indicia;
initiating, with the at least one processor of the payment gateway, acquirer system, or transaction processing system remote from the merchant system, a programmatic timer for a time interval in response to receiving the first transaction request message from the first mobile device;
receiving, with the at least one processor of the payment gateway, acquirer system, or transaction processing system remote from the merchant system, from at least one other mobile device associated with at least one other user account, at least one additional transaction request message prior to expiration of the time interval, the at least one additional transaction request message generated by the at least one other mobile device in response to the at least one other mobile device scanning the machine-readable indicia;

partitioning, with the at least one processor of the payment gateway, acquirer system, or transaction processing system remote from the merchant system, the transaction value between each of the first user account and the at least one other user account based at least partially on the first transaction request message; and generating, with the at least one processor of the payment gateway, acquirer system, or transaction processing system remote from the merchant system, a separate authorization request message for each of the first user account and the at least one other user account, each authorization request message comprising a partial transaction value representing a portion of the transaction value.

2. The computer-implemented method of claim 1, further comprising receiving, from the merchant system, the time interval.

3. The computer-implemented method of claim 1, wherein partitioning the transaction value comprises dividing the transaction value by a total number of user accounts associated with transaction request messages received within the time interval.

4. The computer-implemented method of claim 1, wherein the machine-readable indicia comprises a two-dimensional bar code.

5. The computer-implemented method of claim 1, wherein the machine-readable indicia comprises the split payment identifier.

6. The computer-implemented method of claim 1, wherein the machine-readable indicia comprises a transaction identifier.

7. The computer-implemented method of claim 1, further comprising placing a hold on the first user account for the transaction value in response to receiving the first transaction request message from the first mobile device.

8. A system for partitioning mobile device transactions, comprising:
a merchant system comprising at least one processor programmed or configured to:
generate a machine-readable indicia encoded with transaction data for a transaction between a merchant and at least one user, the transaction data comprising a transaction value; and
at least one processor of a payment gateway, acquirer system, or transaction processing system remote from the merchant system, the at least one processor programmed or configured to:
receive, from a first mobile device associated with a first user account, a first transaction request message comprising the transaction value and a split payment identifier, the first transaction request message generated by the first mobile device in response to the first mobile device scanning the machine- readable indicia;
initiate a programmatic timer for a time interval in response to receiving the first transaction request message from the first mobile device;
receive, from at least one other mobile device associated with at least one other user account, at least one additional transaction request message prior to expiration of the time interval, the at least one additional transaction request message generated by the at least one other mobile device in response to the at least one other mobile device scanning the machine-readable indicia;

partition the transaction value between each of the first user account and the at least one other user account based at least partially on the first transaction request message; and generate a separate authorization request message for each of the first user account and the at least one other user account, each authorization request message comprising a partial transaction value representing a portion of the transaction value.

9. The system of claim 8, wherein the at least one processor is further programmed or configured to receive, from the merchant system, the time interval.

10. The system of claim 8, wherein the at least one processor is further programmed or configured to place a hold on the first user account for the transaction value in response to receiving the first transaction request message from the first mobile device.

11. The system of claim 8, wherein partitioning the transaction value comprises dividing the transaction value by a total number of user accounts associated with transaction request messages received within the time interval.

12. The system of claim 8, wherein the machine-readable indicia comprises a two-dimensional bar code.

13. The system of claim 8, wherein the machine-readable indicia comprises the split payment identifier.

14. The system of claim 8, wherein the machine-readable indicia comprises a transaction identifier.

15. A computer program product for partitioning mobile device transactions, comprising at least one non-transitory computer readable medium including program instructions that, when executed by at least one processor of a merchant system, payment gateway, acquirer system, or transaction processing system, causes the at least one processor to:
generate, with the merchant system, a machine-readable indicia encoded with transaction data for a transaction between a merchant and at least one user, the transaction data comprising a transaction value;
receive, with the payment gateway, acquirer system, or transaction processing system, from a first mobile device associated with a first user account, a first transaction request message comprising the transaction value and a split payment identifier, the first transaction request message generated by the first mobile device in response to the first mobile device scanning the machine-readable indicia;
initiate, with the payment gateway, acquirer system, or transaction processing system, a programmatic timer for a time interval in response to receiving the first transaction request message from the first mobile device;
receive, with the payment gateway, acquirer system, or transaction processing system, from at least one other mobile device associated with at least one other user account, at least one additional transaction request message prior to expiration of the time interval, the at least one additional transaction request message generated bar the at least one other mobile device in response to the at least one other mobile device scanning the machine-readable indicia;
partition, with the payment gateway, acquirer system, or transaction processing system, the transaction value between each of the first user account and the at least one other user account based at least partially on the first transaction request message; and generate, with the payment gateway, acquirer system, or transaction processing system, a separate authorization request message for each of the first user account and the at least one other user account, each authorization request message comprising a partial transaction value representing a portion of the transaction value.

16. The computer program product of claim 15, wherein the at least one processor is further programmed or configured to receive, from the merchant system, the time interval.

17. The computer program product of claim 15, wherein the at least one processor is further programmed or configured to place a hold on the first user account for the transaction value in response to receiving the first transaction request message from the first mobile device.

18. The computer program product of claim 15, wherein partitioning the transaction value comprises dividing the transaction value by a total number of user accounts associated with transaction request messages received within the time interval.

19. The computer program product of claim 15, wherein the machine-readable indicia comprises a two-dimensional bar code.

* * * * *